«12» United States Patent
Cheng

(10) Patent No.: US 8,706,138 B2
(45) Date of Patent: Apr. 22, 2014

(54) MOBILE COMMUNICATION DEVICES AND LOCATION REGISTRATION METHODS

(75) Inventor: Tsung-Yo Cheng, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 178 days.

(21) Appl. No.: 13/242,969

(22) Filed: Sep. 23, 2011

(65) Prior Publication Data

US 2012/0225670 A1    Sep. 6, 2012

(30) Foreign Application Priority Data

Mar. 3, 2011  (TW) .............................. 100107060 A

(51) Int. Cl.
 *H04W 24/00*    (2009.01)
(52) U.S. Cl.
 USPC ..................... 455/456.1; 455/435.1; 455/436; 455/456.5; 455/456.6
(58) Field of Classification Search
 None
 See application file for complete search history.

(56) References Cited

U.S. PATENT DOCUMENTS

2007/0165573 A1*  7/2007  Hietalahti .................... 370/331
2008/0194254 A1*  8/2008  Balon et al. .................. 455/433
2009/0305666 A1* 12/2009  Tian et al. .................... 455/410
2010/0075658 A1*  3/2010  Hou et al. .................. 455/422.1
2010/0144307 A1*  6/2010  Wu ............................. 455/404.1

OTHER PUBLICATIONS

Taiwanese language office action dated Sep. 16, 2013.

* cited by examiner

*Primary Examiner* — Suhail Khan

(74) *Attorney, Agent, or Firm* — McClure, Qualey & Rodack, LLP

(57) ABSTRACT

A mobile communication device with a wireless module and a controller module is provided. The wireless module performs wireless transceiving to and from a first service network. The controller module transmits a location update request message to a first cellular station of the first service network via the wireless module, and receives a location update rejection message, which comprises a rejection cause indicating a network related failure, from the first cellular station via the wireless module. Also, the controller module transmits another location update request message to a second cellular station of the first service network via the wireless module in response to the location update rejection message. Particularly, the first cellular station and the second cellular station belong to a first location area and a second location area, respectively.

12 Claims, 12 Drawing Sheets

MOBILE COMMUNICATION DEVICES AND LOCATION REGISTRATION METHODS

CROSS REFERENCE TO RELATED APPLICATIONS

This Application claims priority of Taiwan Patent Application No. 100107060, filed on Mar. 3, 2011, the entirety of which is incorporated by reference herein.

BACKGROUND OF THE INVENTION

1. Field of the Invention

The invention generally relates to the field of mobile communications, and more particularly, to methods for speeding up location registration procedures, enabling the mobile communication devices to switch away from a problematic location area to another normal-service location area for performing location registration procedures to obtain mobile communication services.

2. Description of the Related Art

In a typical mobile communications environment, a User Equipment (UE) may communicate voice and/or data signals with one or more service networks. The wireless communications between the UE and the service networks may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, and others.

In general, a UE may camp on a cellular station with best reception, and perform a location registration procedure via the cellular station to register itself to the service network to which the cellular station belongs. Specifically, during the location registration procedure, the UE transmits the registration information, including the identification of the UE, and the current location area of the UE, etc., to the service network. According to the registration information, the service network determines whether to accept the location registration request from the UE. For example, the service network may determine the subscription status of the UE according to the identification of the UE, or may determine whether the service capacity is enough for serving the UE according to the current location of the UE. After that, the service network may reply to the UE with the result of the location registration request. If the location registration request is accepted, the UE may obtain mobile communication services, such as the voice and/or data services, from the service network.

Note that, the operator of the service network may periodically practice maintenance or updates of the cellular stations belonging to a specific location area. In this situation, the UEs remaining in the specific location area may fail to register themselves to the service network and may not be able to obtain mobile communication services from the service network. Take the WCDMA technology in compliance with release 5 to 7 of the 3GPP TS 24.008 specification (referred to herein as the TS 24.008 specification), and releases 6 and 7 of the 3GPP TS 23.122 specification (referred to herein as the TS 23.122 specification) for example. When the location registration request of a UE is rejected by a WCDMA system, the UE may retransmit the location registration request for a predetermined number of times until the registration request is accepted. However, if the UE is still rejected after retransmitting the location registration request for the predetermined number of times, then the UE releases the Radio Resource (RR) connection, i.e., the connection between the UE and the service network, and enters the Mobility Management (MM) idle mode. When in the MM idle mode, the UE has to wait for a period of time to re-perform the location registration procedure, or to perform a Public Land Mobile Network (PLMN) search procedure. Disadvantageously, whether re-performing the location registration procedure or performing a PLMN search procedure, a great deal of time is required for the UE to successfully register itself to the service network and obtain mobile communication services. As a result, real-time user experience may be hard to guarantee due to the break-off of the mobile communication services.

BRIEF SUMMARY OF THE INVENTION

Accordingly, embodiments of the invention provide mobile communication devices and location registration methods for efficiently performing location registration procedures. In one aspect of the invention, a mobile communication device comprising a wireless module and a controller module is provided. The wireless module is arranged for performing wireless transceiving to and from a first service network. The controller module is arranged for transmitting a location update request message to a first cellular station of the first service network via the wireless module, and receiving a location update rejection message from the first cellular station via the wireless module. Also, the controller module is arranged for transmitting another location update request message to a second cellular station of the first service network via the wireless module in response to the location update rejection message. Particularly, the location update rejection message comprises a rejection cause indicating a network related failure, and the first cellular station and the second cellular station belong to a first location area and a second location area, respectively.

In another aspect of the invention, a location registration method, applied in a mobile communication device wirelessly connected to a first service network, is provided. The location registration method comprises the steps of transmitting a location update request message to a first cellular station of the first service network, receiving a location update rejection message from the first cellular station, wherein the location update rejection message comprises a rejection cause indicating a network related failure, and transmitting another location update request message to a second cellular station of the first service network in response to the location update rejection message, wherein the first cellular station and the second cellular station belong to a first location area and a second location area, respectively.

Other aspects and features of the invention will become apparent to those with ordinary skill in the art upon review of the following descriptions of specific embodiments of the mobile communication devices and the location registration methods.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto.

Figure 1:
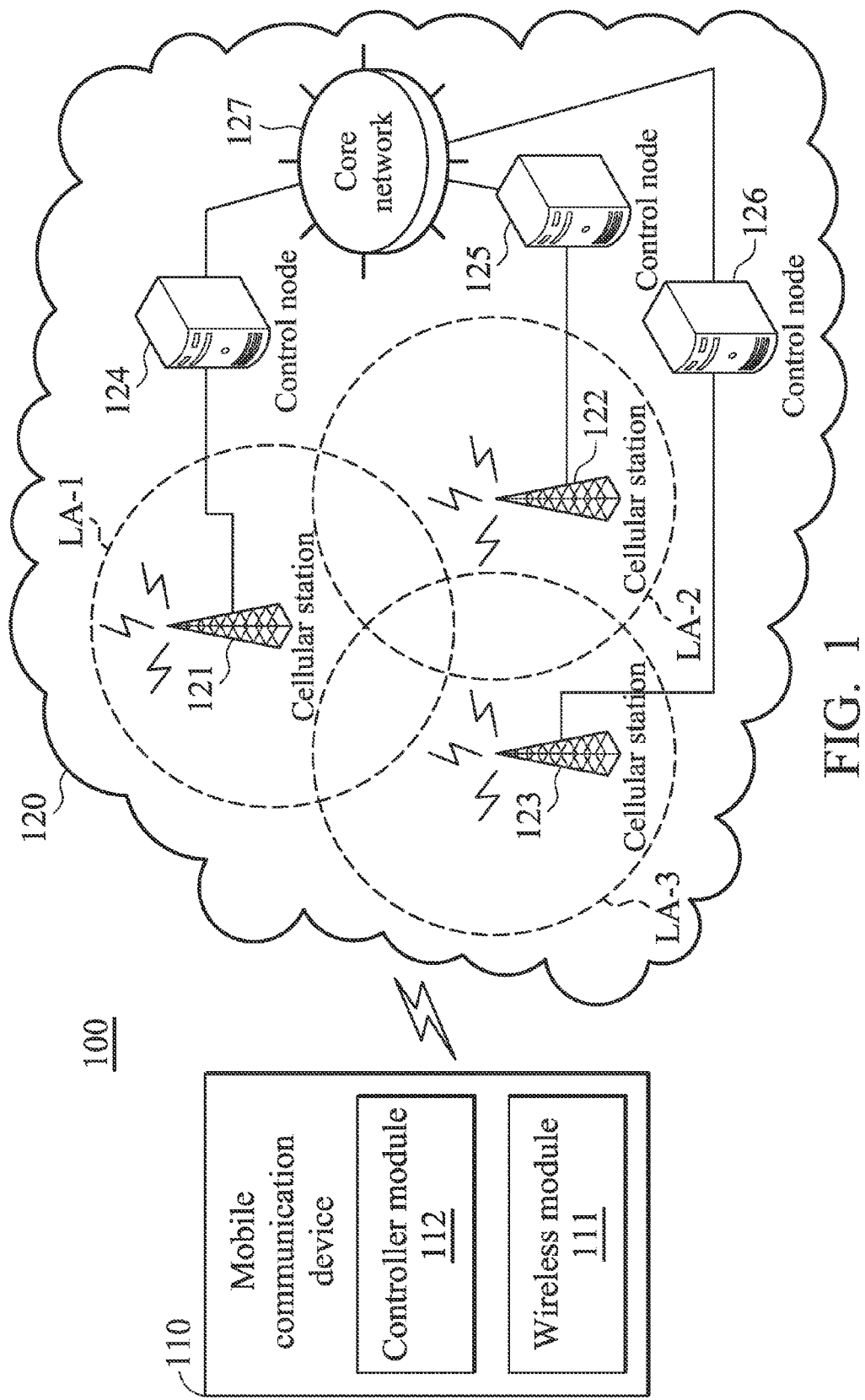
FIG. 1 is a block diagram illustrating a mobile communication environment according to an embodiment of the invention.

FIG. 1 is a block diagram illustrating a mobile communication environment according to an embodiment of the invention. In the mobile communication environment 100, the mobile communication device 110 is wirelessly connected to the service network 120 via the air interface for performing wireless transmission and receptions therebetween. In one embodiment, the service network 120 may be a WCDMA system, while in another embodiment, the service network 120 may be an LTE system, and the invention is not limited thereto. The service network 120 comprises the cellular stations 121 to 123, the control nodes 124 to 126, and the core network 127, wherein the cellular stations 121 to 123 are controlled by the control nodes 124 to 126, respectively, to provide the functionality of wireless transceiving for the service network 120. Particularly, the cellular stations 121 to 123 belong to the location areas LA-1 to LA-3 of the service network 120. Although not shown, the location areas LA-1 to LA-3 may comprise cellular stations other than the cellular stations 121 to 123. In other words, each of the control nodes 124 to 126 is configured to control all of the cellular stations belonging to a respective location area. The mobile communication device 110 comprises a wireless module 111 arranged for performing the functionality of wireless transceiving. To further clarify, the wireless module 111 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in the UMTS systems, or may be 900 MHz, 2100 MHz, or 2.6 GHz utilized in LTE systems, or others depending on the radio access technology (RAT) in use. Also, the mobile communication device 110 comprises a controller module 112 arranged for controlling the operation of the wireless module 111 and other functional components, such as a display unit and/or keypad serving as the MMI (man-machine interface), a storage unit storing the program codes of applications or communication protocols, or others.

Figure 2:
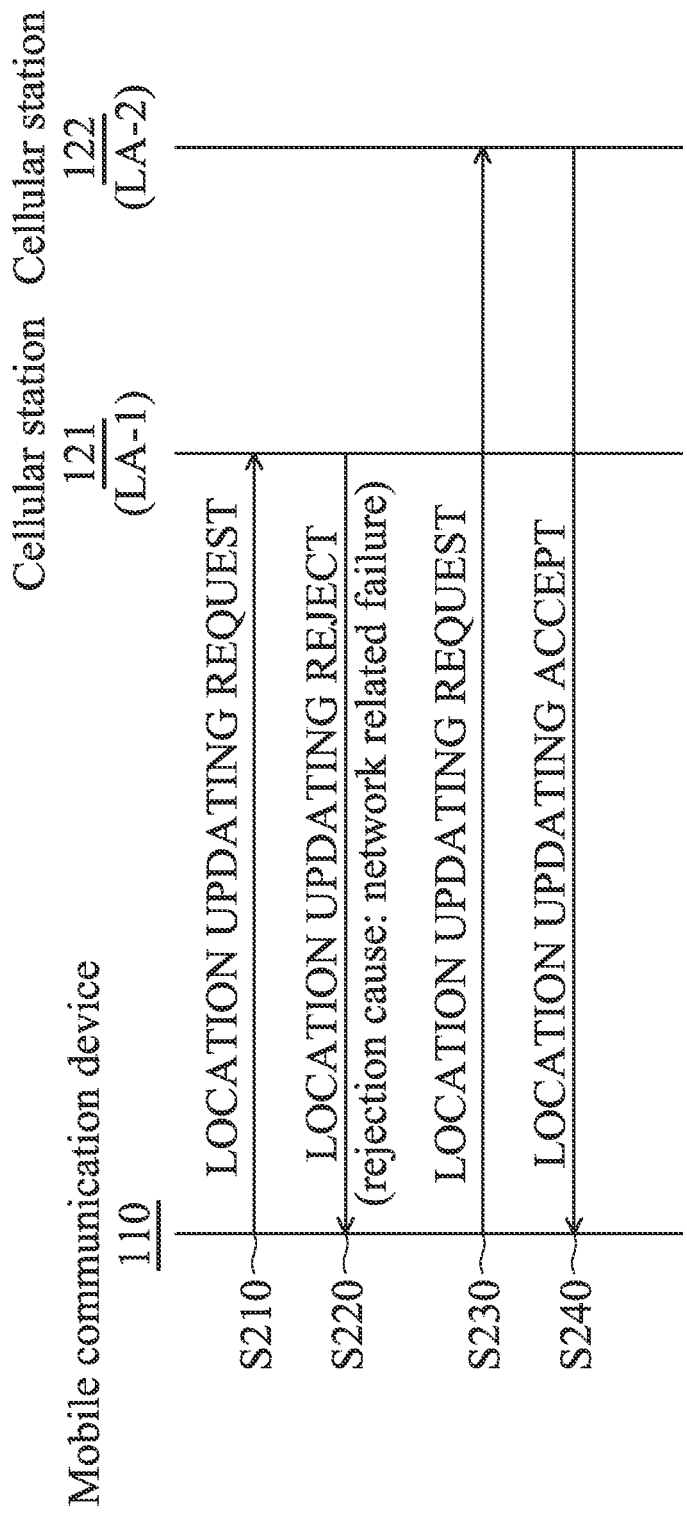
FIG. 2 is a message sequence chart illustrating an intra-PLMN location registration procedure according to an embodiment of the invention.

To be more specific, the controller module 112 is arranged for controlling the wireless module 111 to perform location registration procedures with the service network 120. FIG. 2 is a message sequence chart illustrating an intra-PLMN location registration procedure according to an embodiment of the invention. In this embodiment, the service network 120 is a WCDMA system and the mobile communication device 110 is a UE in compliance with the TS 24.008 and TS 23.122 specifications and/or other specifications of the WCDMA technology. Particularly, the mobile communication device 110 is in an area where the signal coverage of the cellular stations 121 to 123 overlaps. That is, the mobile communication device 110 may receive wireless signals from all of the cellular stations 121 to 123. Due to the fact that the detected signal strength of the cellular station 121 is greater than the signal strength of the cellular stations 122 and 123, the mobile communication device 110 first transmits a LOCATION UPDATING REQUEST message to the cellular station 121 (step S210). The LOCATION UPDATING REQUEST message may comprise the information concerning the UE identification of the mobile communication device 110 and the current location area of the mobile communication device 110, wherein the UE identification may be the International Mobile Subscriber Identity (IMSI), Temporary Mobile Subscriber Identity (TMSI), Packet-TMSI (P-TMSI), International Mobile Equipment Identity (IMEI), or IMEI and Software Version (IMEISV) of the mobile communication device 110, and the current location area may be indicated by the location area number of the cellular station 121, i.e., LA-1, which the mobile communication device 110 may receive from the broadcast system information of the cellular station 121. In this embodiment, since the cellular station 121 is under maintenance or conducting system updates, the service network 120 replies to the mobile communication device 110 with a LOCATION UPDATING REJECT message via the cellular station 121 (step S220). The LOCATION UPDATING REJECT message comprises a rejection cause indicating a network related failure. Specifically, the LOCATION UPDATING REJECT message may comprise a data field named "reject cause" with a value set to "Network Failure". As the mobile communication device 110 is in an area where the signal coverage of the cellular stations 121 to 123 overlaps, the mobile communication device 110 may subsequently transmit another LOCATION UPDATING REQUEST message to the cellular station 122 or 123 in response to the LOCATION UPDATING REJECT message comprising a rejection cause indicating a network related failure. Specifically, the cellular stations 122 and 123 have normal services, and the controller module 112 may select the one with the greater signal strength to transmit another LOCATION UPDATING REQUEST message to. In this embodiment, the signal strength of the cellular station 122 is greater than the signal strength of the cellular station 123, so the mobile communication device 110 transmits another LOCATION UPDATING REQUEST message to the cellular station 122 (step S230). When receiving the LOCATION UPDATING REQUEST message, the service network 120 replies to the mobile communication device 110 with a LOCATION UPDATING ACCEPT message via the cellular station 122 (step S240). The location registration procedure ends when the mobile communication device 110 receives the LOCATION UPDATING ACCEPT message.

Figure 3:
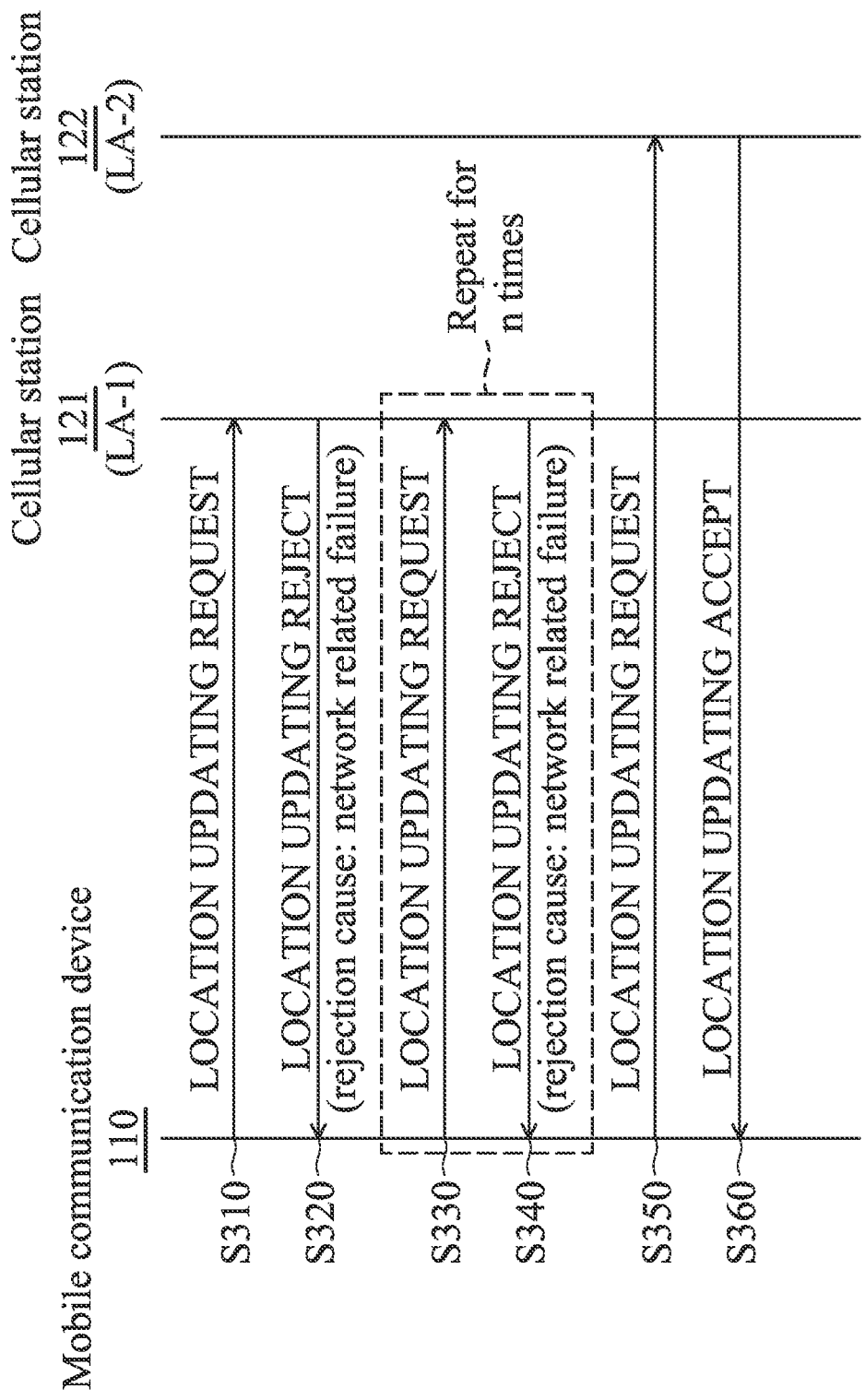
FIG. 3 is a message sequence chart illustrating an intra-PLMN location registration procedure according to another embodiment of the invention.

FIG. 3 is a message sequence chart illustrating an intra-PLMN location registration procedure according to another embodiment of the invention. Similar to FIG. 2, the mobile communication device 110 is in an area where the signal coverage of the cellular stations 121 to 123 overlaps. To begin, the mobile communication device 110 first transmits a LOCATION UPDATING REQUEST message to the cellular station 121 (step S310). Due to the fact that the cellular station 121 (and/or the control node 124) is under maintenance or conducting system updates, the mobile communication device 110 subsequently receives a LOCATION UPDATING REJECT message from the cellular station 121 (step S320). Specifically, the LOCATION UPDATING REJECT message comprises a rejection cause indicating a network related failure. Different from FIG. 2, the mobile communication device 110 retransmits the LOCATION UPDATING REQUEST message to the cellular station 121 in response to the LOCATION UPDATING REJECT message comprising a rejection cause indicating a network related failure (step S330), and again receives a LOCATION UPDATING REJECT message from the cellular station 121 since the cellular station 121 is still under maintenance or conducting system updates (step S340). Note that, the retransmission of the LOCATION UPDATING REQUEST message may be performed for a predetermine number of times (denoted as n), until a LOCATION UPDATING ACCEPT message is received or the predetermined number of times is reached. That is, steps S330 and 340 may be repeated for the predetermined number of times. When the retransmission of the LOCATION UPDATING REQUEST message is performed for the predetermine number of times, the controller module 112 transmits another LOCATION UPDATING REQUEST message to the cellular station 122 via the wireless module 111 (step S350). For the cellular station 122 having normal services, the service network 120 replies to the mobile communication device 110 with a LOCATION UPDATING ACCEPT message (step S360). The location registration procedure ends when the mobile communication device 110 receives the LOCATION UPDATING ACCEPT message.

Figure 4:
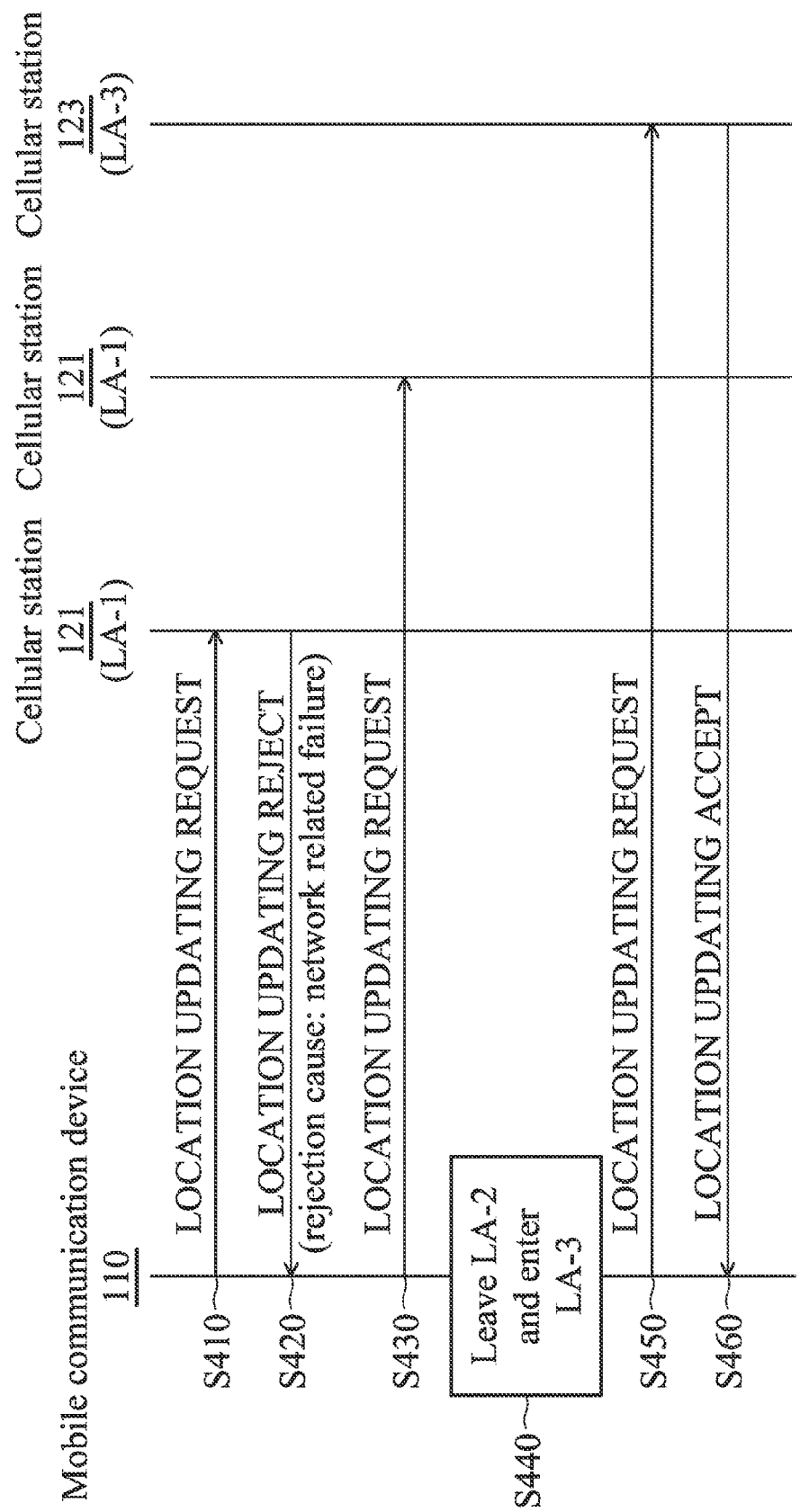
FIG. 4 is a message sequence chart illustrating an intra-PLMN location registration procedure according to yet another embodiment of the invention.

FIG. 4 is a message sequence chart illustrating an intra-PLMN location registration procedure according to yet another embodiment of the invention. Similar to FIG. 3, the mobile communication device 110 is in an area where the signal coverage of the cellular stations 121 to 123 overlaps. To begin, the controller module 112 first transmits a LOCATION UPDATING REQUEST message to the cellular station 121 (step S410). Due to the fact that the cellular station 121 (and/or the control node 124) is under maintenance or conducting system updates, the mobile communication device 110 subsequently receives a LOCATION UPDATING REJECT message from the cellular station 121 (step S420). Specifically, the LOCATION UPDATING REJECT message comprises a rejection cause indicating a network related failure. The controller module 112 determines to transmit another LOCATION UPDATING REQUEST message to the cellular station 122 according to the signal strength of the cellular stations 122 and 123, in response to the LOCATION UPDATING REJECT message comprising a rejection cause indicating a network related failure (step S430). Different from FIG. 3, before receiving a response message from the cellular station 122, the mobile communication device 110 moves away from the location area of the cellular station 122 (denoted as LA-2) to the location area of the cellular station 123 (denoted as LA-3) (step S440). In response to the movement, the controller module 112 transmits another LOCATION UPDATING REQUEST message to the cellular station 123 via the wireless module 111 (step S450). For the cellular station 123 having normal services, the service network 120 replies to the mobile communication device 110 with a LOCATION UPDATING ACCEPT message via the cellular station 123 (step S460). The location registration procedure ends when the mobile communication device 110 receives the LOCATION UPDATING ACCEPT message.

Figure 5:
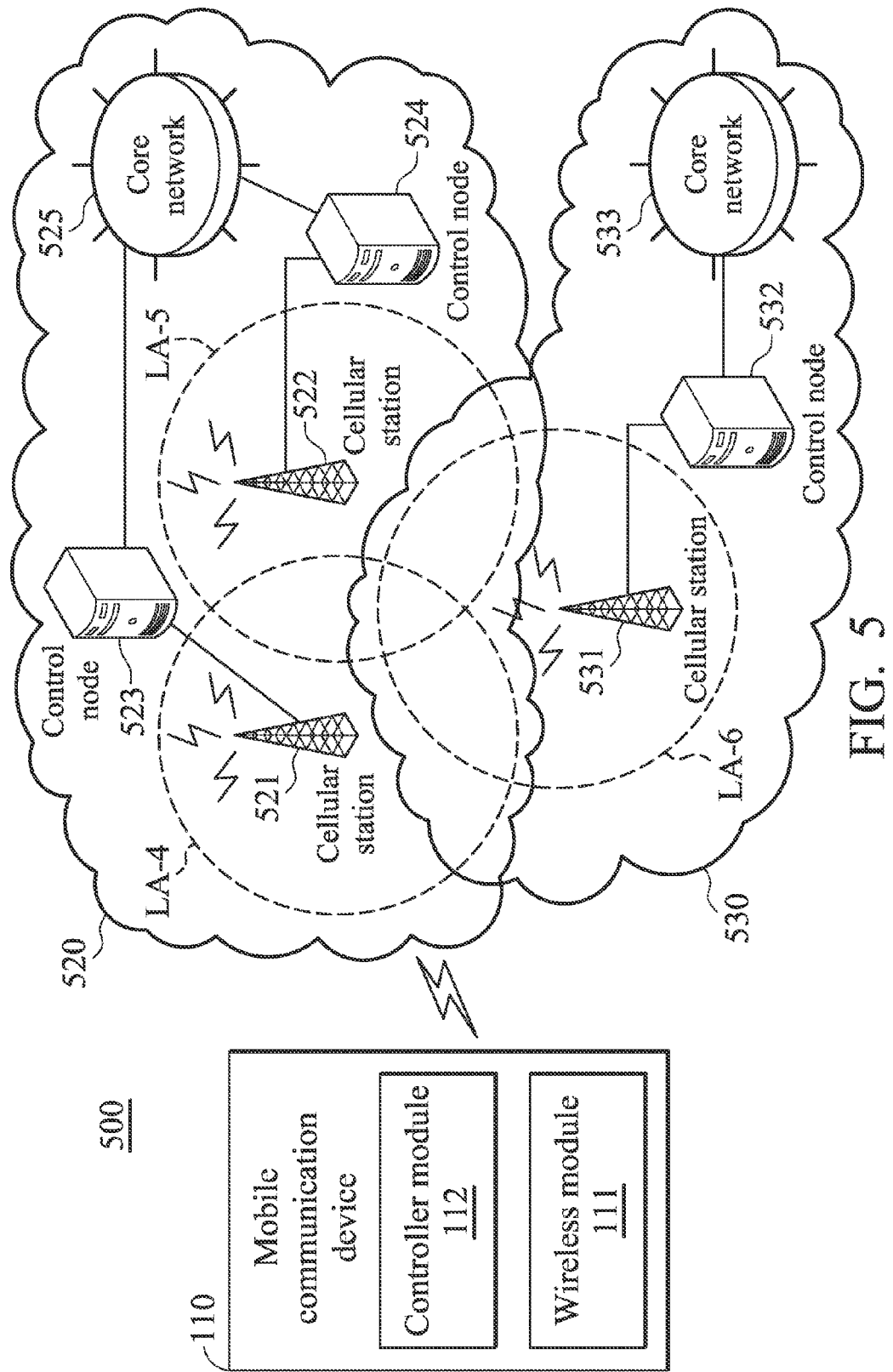
FIG. 5 is a block diagram illustrating a mobile communication environment according to another embodiment of the invention.

FIG. 5 is a block diagram illustrating a mobile communication environment according to another embodiment of the invention. In the mobile communication environment 500, the mobile communication device 110 is wirelessly connected to the service networks 520 or 530 via the air interface for performing wireless transmission and receptions therebetween. Particularly, the service networks 520 and 530 belong to different PLMNs, i.e., deployed and maintained by different operators. Note that, the service networks 520 and 530 may use the same or different wireless technologies. For example, the service network 520 may be a WCDMA system or an LTE system, and similarly, the service network 530 may be a WCDMA system or an LTE system, and the invention is not limited thereto. To further clarify, the service network 520 comprise the cellular stations 521 and 522, the control nodes 523 and 524, and the core network 525, wherein the cellular stations 521 and 522 are controlled by the control nodes 523 and 524, respectively, to provide the function of wireless transceiving for the service network 520. The service network 530 comprises the cellular station 531, the control node 532, and the core network 533, wherein the cellular stations 531 is controlled by the control node 532 to provide the function of wireless transceiving for the service network 530. Though not shown, the location areas LA-4 to LA-6 may comprise cellular stations other than the cellular stations 521, 522, and 531. That is, each of the control nodes 523, 524, and 532 is configured to control all of the cellular stations belonging to a respective location area.

Figure 6:
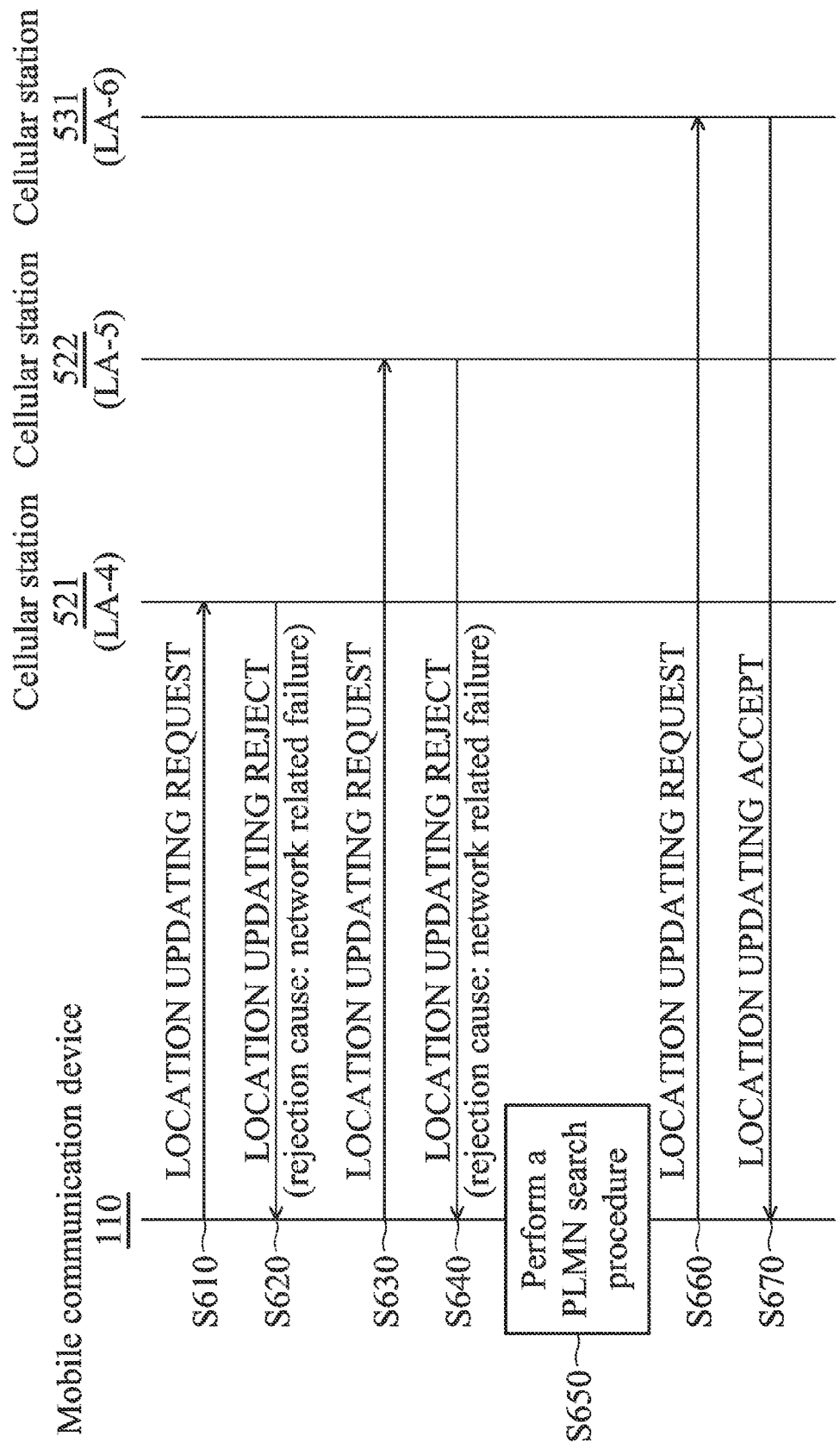
FIG. 6 is a message sequence chart illustrating an inter-PLMN location registration procedure according to an embodiment of the invention.

FIG. 6 is a message sequence chart illustrating an inter-PLMN location registration procedure according to an embodiment of the invention. In this embodiment, the mobile communication device 110 is in an area where the signal coverage of the cellular stations 521, 522, and 531 overlaps, and the cellular stations 521 and 522 are under maintenance or conducting system updates while the cellular station 531 is in normal service. To begin, the controller module 112 first transmits a LOCATION UPDATING REQUEST message to the cellular station 121 in response to detecting that the signal strength of the cellular station 521 is greater than the signal strength of the cellular stations 522 and 531 (step S610). Due to the fact that the cellular station 521 (and/or the control node 523) is under maintenance or conducting system updates, the mobile communication device 110 subsequently receives a LOCATION UPDATING REJECT message from the cellular station 521 (step S620). Specifically, the LOCATION UPDATING REJECT message comprises a rejection cause indicating a network related failure. Next, the controller module 112 determines to transmit another LOCATION UPDATING REQUEST message to the cellular station 522 according to the signal strength of the cellular stations 522 and 531 (step S630). For the cellular station 522 (and/or the control node 524) being under maintenance or conducting system updates, the service network 520 replies to the mobile communication device 110 with a LOCATION UPDATING REJECT message via the cellular station 522 (step S640). Since there is no other cellular station left in the service network 520 which the mobile communication device 110 has not tried to register, the controller module 112 performs a PLMN search procedure via the wireless module 111 (step S650). According to the result of the PLMN search procedure, the controller module 112 discovers that another PLMN, i.e., the service network 530, is available. Thus, the controller module 112 transmits another LOCATION UPDATING REQUEST message to the cellular station 531 (step S660). For the cellular station 531 having normal services, the service network 530 replies to the mobile communication device 110 with a LOCATION UPDATING ACCEPT message via the cellular station 531 (step S670). The location registration procedure ends when the mobile communication device 110 receives the LOCATION UPDATING ACCEPT message.

Figure 7:
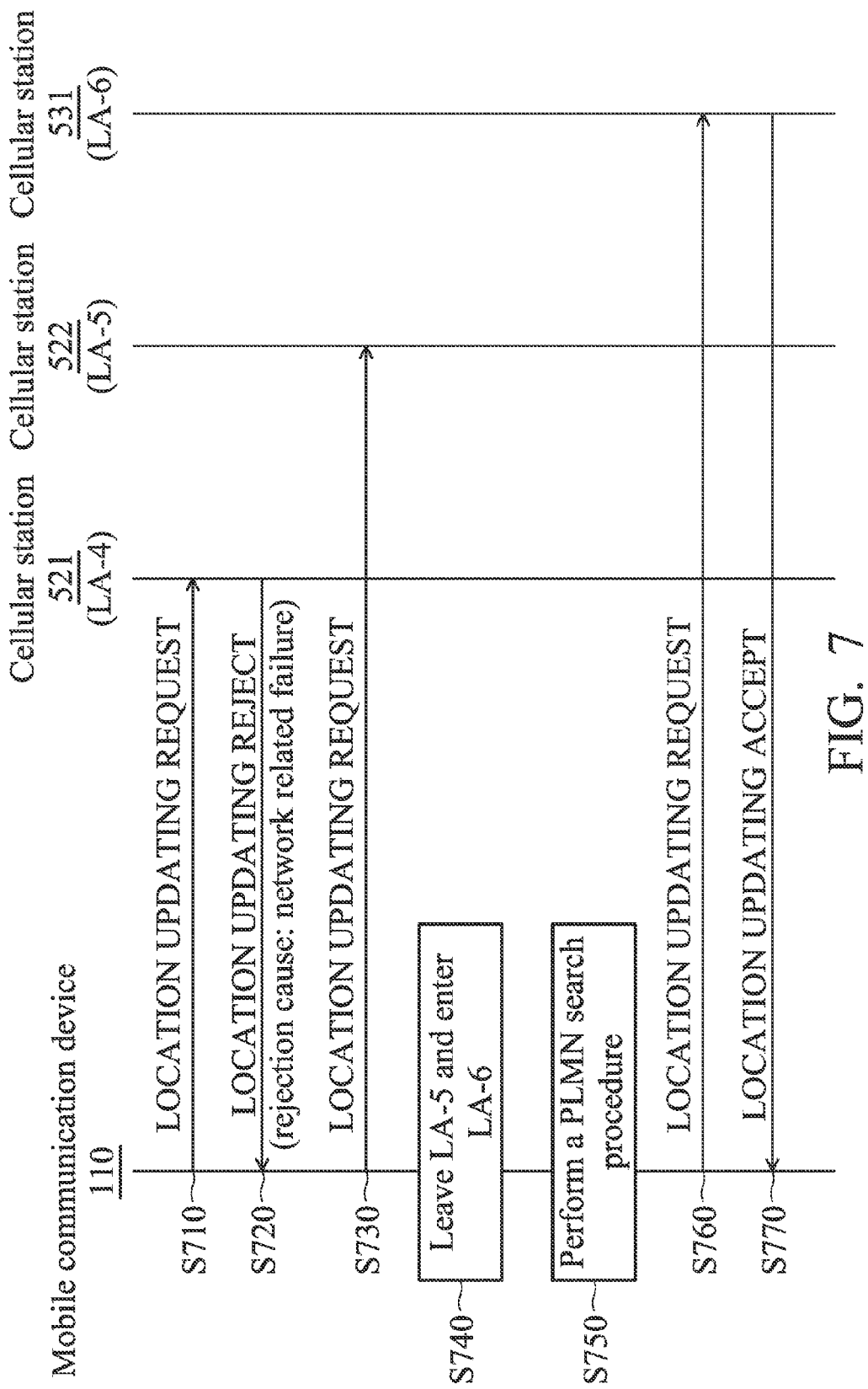
FIG. 7 is a message sequence chart illustrating an inter-PLMN location registration procedure according to another embodiment of the invention.

FIG. 7 is a message sequence chart illustrating an inter-PLMN location registration procedure according to another embodiment of the invention. Similar to FIG. 6, the mobile communication device 110 is in an area where the signal coverage of the cellular stations 521, 522, and 531 overlaps. To begin, the controller module 112 first transmits a LOCATION UPDATING REQUEST message to the cellular station 121 in response to detecting that the signal strength of the cellular station 521 is greater than the signal strength of the cellular stations 522 and 531 (step S710). Due to the fact that the cellular station 521 (and/or the control node 523) is under maintenance or conducting system updates, the mobile communication device 110 subsequently receives a LOCATION UPDATING REJECT message from the cellular station 521 (step S720). Specifically, the LOCATION UPDATING REJECT message comprises a rejection cause indicating a network related failure. Next, the controller module 112 determines to transmit another LOCATION UPDATING REQUEST message to the cellular station 522 according to the signal strength of the cellular stations 522 and 531 (step S730). Different from FIG. 6, before receiving a response message from the cellular station 522, the mobile communication device 110 moves away from the location area of the cellular station 522 (denoted as LA-5) to the location area of the cellular station 531 (denoted as LA-6) (step S740). In response to the movement, the controller module 112 determines that there is no other cellular station left in the service network 520 which the mobile communication device 110 has not tried to register, and then performs a PLMN search procedure via the wireless module 111 (step S750). According to the result of the PLMN search procedure, the controller module 112 discovers that another PLMN, i.e., the service network 530, is available. Thus, the controller module 112 transmits another LOCATION UPDATING REQUEST message to the cellular station 531 via the wireless module 111 (step S760). For the cellular station 531 having normal services, the service network 530 replies to the mobile communication device 110 with a LOCATION UPDATING ACCEPT message via the cellular station 531 (step S770). The location registration procedure ends when the mobile communication device 110 receives the LOCATION UPDATING ACCEPT message.

Note that, in another embodiment, the service networks 520 and 530 may belong to the same PLMN but use different wireless technologies. For example, the service networks 520 and 530 may be a WCDMA system and an LTE system, respectively, deployed by the same operator, and the proposed inter-PLMN location registration procedure may also be applied thereto.

Figure 8:
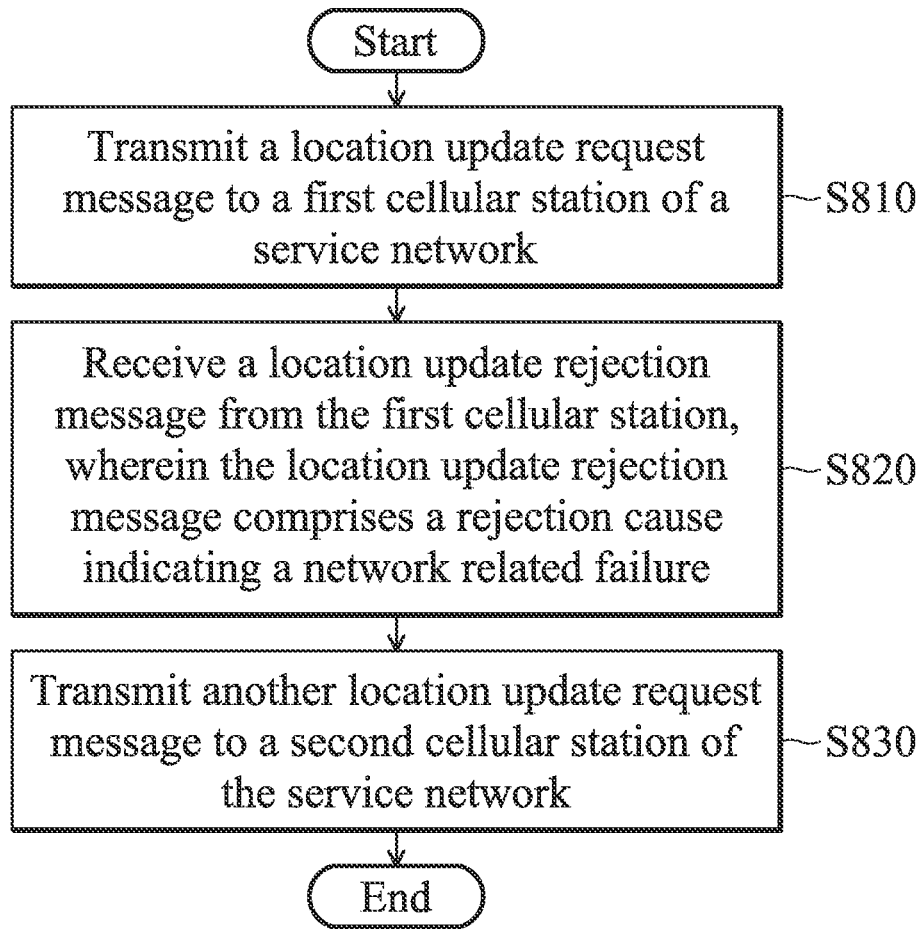
FIG. 8 is a flow chart illustrating a location registration method according to an embodiment of the invention.

FIG. 8 is a flow chart illustrating a location registration method according to an embodiment of the invention. In this embodiment, the location registration method is applied in a mobile communication device for performing a location registration procedure. To begin, the mobile communication device transmits a location update request message to a first cellular station of a service network (step S810). Specifically, the first cellular station belongs to a first location area of the service network. Subsequently, the mobile communication device receives a location update rejection message from the first cellular station, wherein the location update rejection message comprises a rejection cause indicating a network related failure (step S820). Unlike the conventional location registration procedure, the location registration method proposes to transmit another location update request message to a second cellular station of the service network in response to the location update rejection message comprising a rejection cause indicating a network related failure (step S830). Note that, the second cellular station belongs to a second location area of the service network. That is, the first cellular station and the second cellular station belong to different location areas of the service network. Since there is a small possibility that the cellular stations belonging to different location areas are under maintenance or conducting system updates at the same time, the location registration method of the invention may enable the mobile communication device to successfully register to the service network and obtain mobile communication services sooner.

Figure 9A:
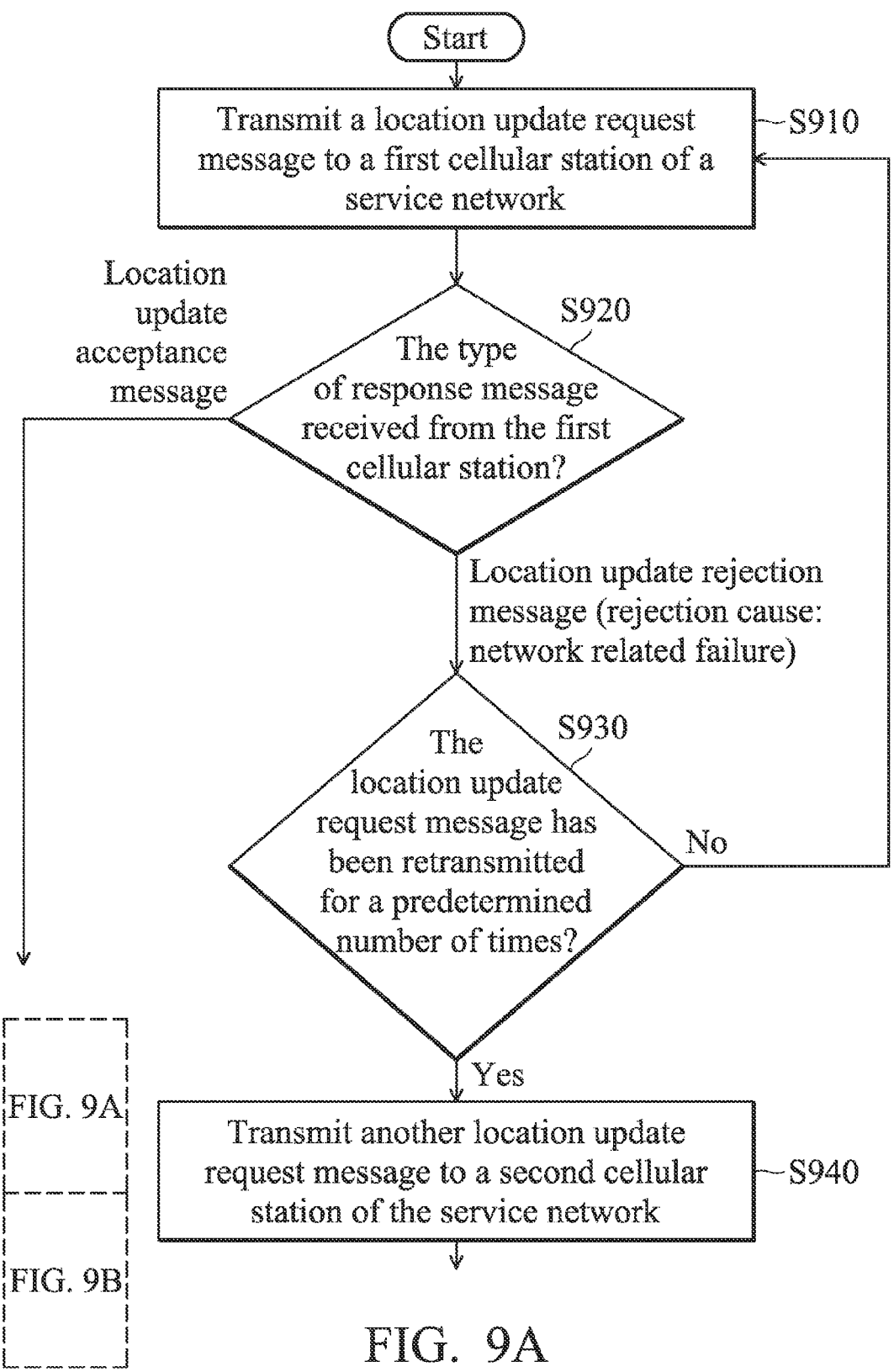
FIGS. 9A and 9B show a flow chart illustrating a location registration method according to another embodiment of the invention.
Figure 9B:
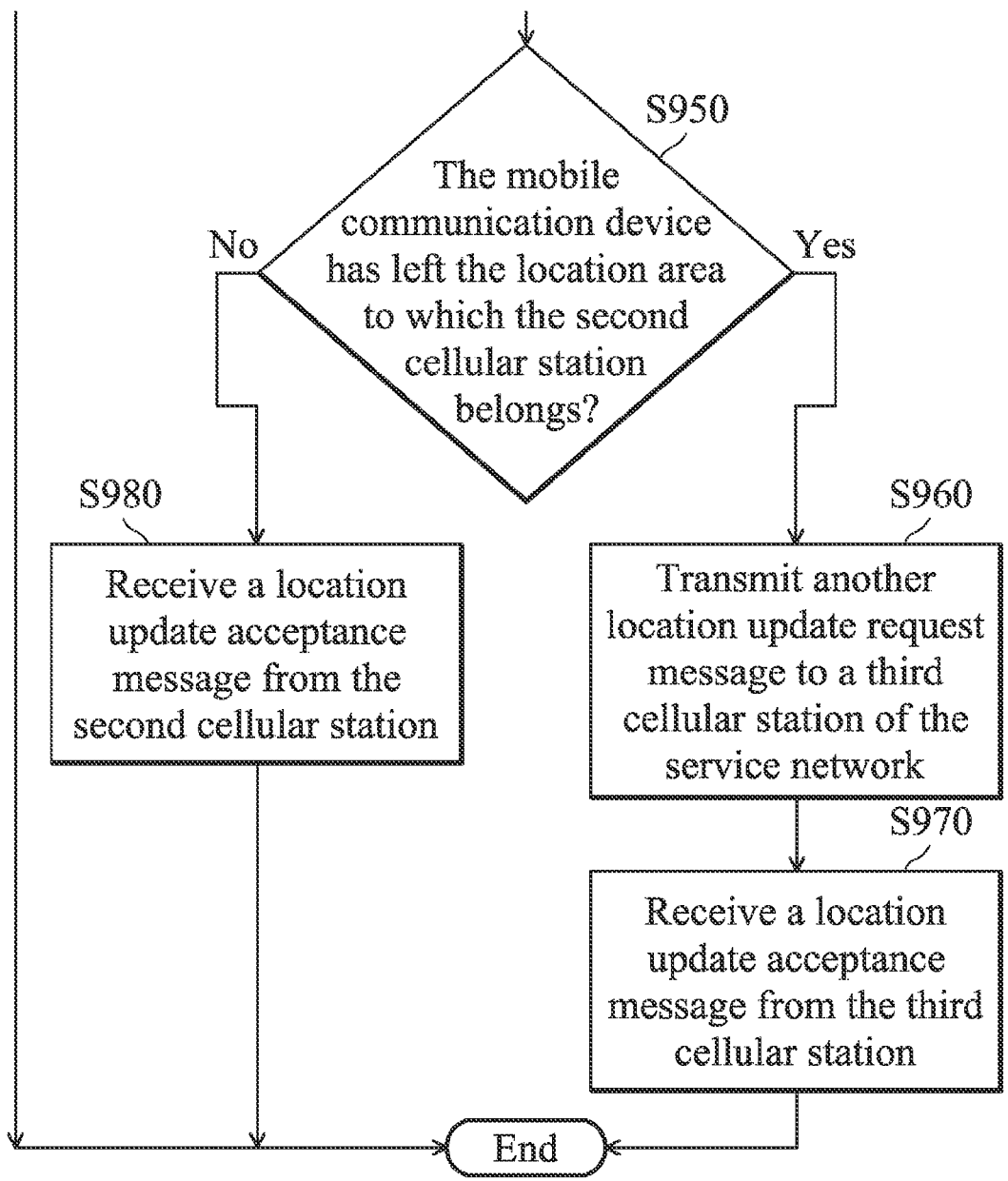

FIGS. 9A and 9B show a flow chart illustrating a location registration method according to another embodiment of the invention. In this embodiment, the location registration method is applied in a mobile communication device for performing an intra-PLMN location registration procedure. To begin, the mobile communication device transmits a location update request message to a first cellular station of a service network (step S910). Specifically, the first cellular station belongs to a first location area of the service network and is under maintenance or conducting system updates. Subsequently, the mobile communication device receives a response message from the first cellular station (step S920). If the response message is a location update acceptance message, the location registration method ends. Otherwise, if the response message is a location update rejection message comprising a rejection cause indicating a network related failure, then the mobile communication device determines whether the location update request message has been retransmitted for a predetermined number of times (step S930). If not, the location registration method goes back to step S910, and otherwise, if the location update request message has been retransmitted for the predetermined number of times, then the mobile communication device transmits another location update request message to a second cellular station of the service network (step S940). Specifically, the second cellular station belongs to a second location area of the service network. That is, the first cellular station and the second cellular station belong to different location areas of the service network. Next, the mobile communication device determines whether it has left the location area to which the second cellular station belongs (step S950). If so, the mobile communication device further transmits another location update request message to a third cellular station of the service network (step S960), and receives a location update acceptance message from the third cellular station (step S970). Otherwise, if the mobile communication device is still in the location area to which the second cellular station belongs, the mobile communication device further receives a location update acceptance message from the second cellular station (step S980).

Figure 10A:
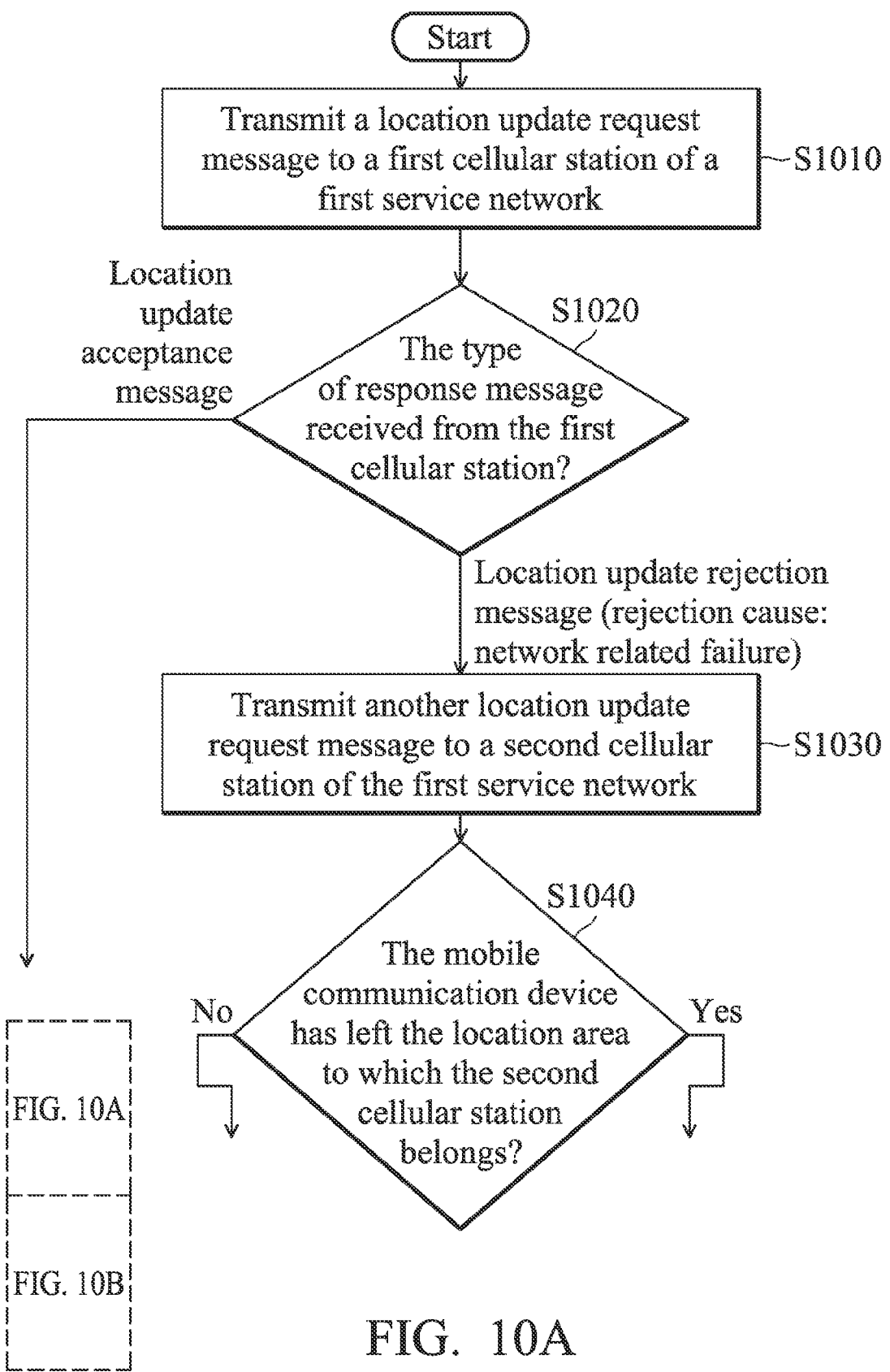
FIGS. 10A and 10B show a flow chart illustrating a location registration method according to yet another embodiment of the invention.
Figure 10B:
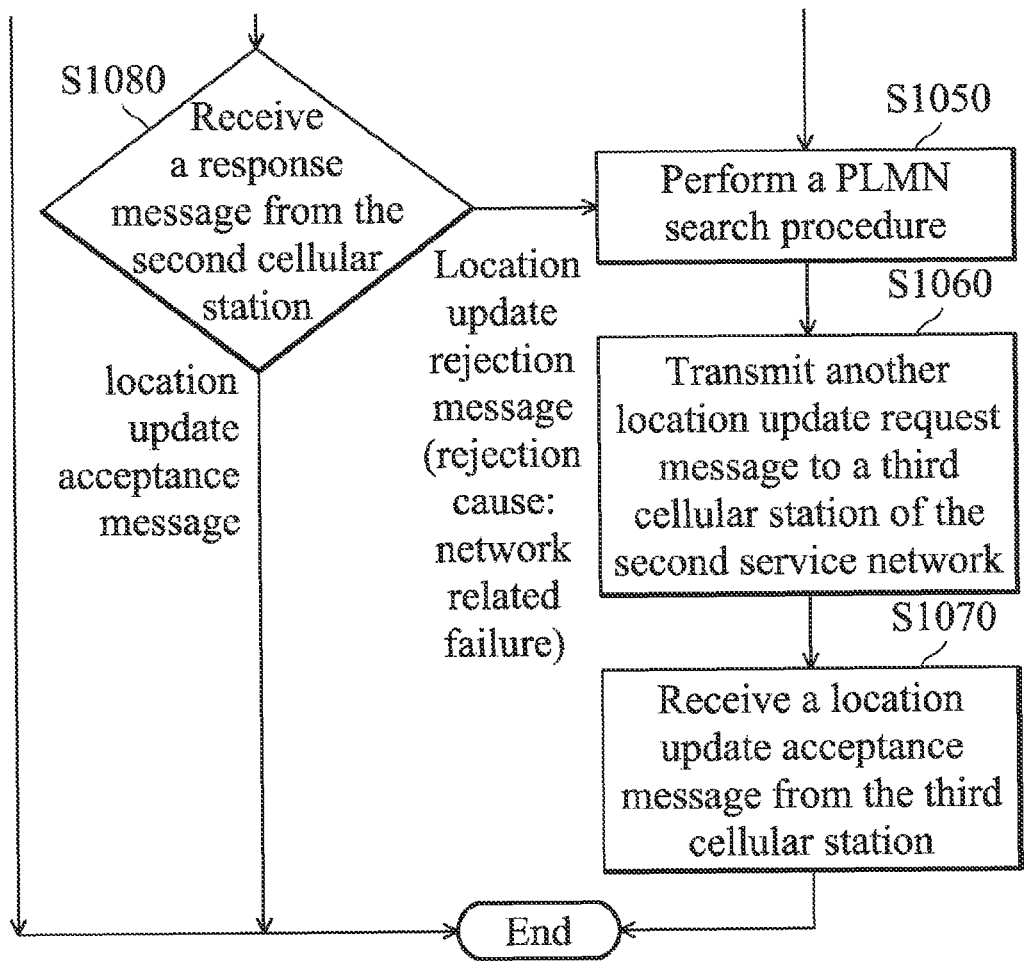

FIGS. 10A and 10B show a flow chart illustrating a location registration method according to yet another embodiment of the invention. In this embodiment, the location registration method is applied in a mobile communication device for performing an inter-PLMN location registration procedure. To begin, the mobile communication device transmits a location update request message to a first cellular station of a first service network (step S1010). Specifically, the first cellular station belongs to a first location area of the first service network and is under maintenance or conducting system updates. Subsequently, the mobile communication device receives a response message from the first cellular station (step S1020). If the response message is a location update acceptance message, the location registration method ends. Otherwise, if the response message is a location update rejection message comprising a rejection cause indicating a network related failure, then the mobile communication device transmits another location update request message to a second cellular station of the first service network (step S1030). Specifically, the second cellular station belongs to a second location area of the first service network. That is, the first cellular station and the second cellular station belong to different location area of the first service network. Next, the mobile communication device determines whether it has left the location area to which the second cellular station belongs (i.e., the second location area) (step S1040). If so, the mobile communication device performs a PLMN search procedure and detects that a second service network is available, since there's no other cellular station in the current location of the mobile communication device (step S1050). After that, the mobile communication device transmits another location update request message to a third cellular station of the second service network (step S1060). For the third cellular station having normal services, the mobile communication device receives a location update acceptance message from the third cellular station (step S1070). Subsequent to step S1040, if the mobile communication device is still in the location area to which the second cellular station belongs, the mobile communication device receives a response message from the second cellular station (step S1080). If the response message is a location update acceptance message, the location registration method ends, and otherwise, if the response message is a location update rejection message comprising a rejection cause indicating a network related failure, then the flow of the method proceeds to step S1050 to perform a PLMN search procedure.

Note that, the location update request message may be a LOCATION UPDATING REQUEST message in a WCDMA system or an LTE system, the location update rejection message may be a LOCATION UPDATING REJECT message in a WCDMA system or an LTE system, and the location update acceptance message may be a LOCATION UPDATING ACCEPT message in a WCDMA system or an LTE system. In addition, the first service network and the second service network may belong to different PLMNs, or may belong to the same PLMN but use different wireless technologies. For example, the first service network and the second service network may be a WCDMA system and an LTE system, respectively, deployed by the same operator, and the invention is not limited thereto.

While the invention has been described by way of example and in terms of preferred embodiment, it is to be understood that the invention is not limited thereto. Those who are skilled in this technology can still make various alterations and modifications without departing from the scope and spirit of this invention. For example, in addition to the WCDMA technology and the LTE technology, the location registration method may also be applied for mobile communications devices and service networks which are in compliance with the LTE-Advanced technology, or any evolutionary technology of the WCDMA/LTE technology family. Therefore, the scope of the invention shall be defined and protected by the following claims and their equivalents.

What is claimed is:

1. A mobile communication device, comprising:
a wireless module, arranged for performing wireless transceiving to and from a first cellular station and a second cellular station of a first service network, wherein the first cellular station and the second cellular station belong to a first location area and a second location area, respectively; and
a controller module, arranged for transmitting a location update request message to the first cellular station of the first service network via the wireless module, receiving a location update rejection message from the first cellular station via the wireless module, and transmitting another location update request message to the second cellular station of the first service network via the wireless module in response to the mobile communication device being in an overlapped area of the first location area and the second location area and receiving the location update rejection message,
wherein the location update rejection message comprises a rejection cause indicating a network related failure.

2. The mobile communication device of claim 1, wherein the controller module is further arranged for retransmitting the location update request message to the first cellular station via the wireless module, in response to the location update rejection message, and the retransmission of the location update request message is performed for a predetermined number of times until a location update acceptance message is received from the first cellular station.

3. The mobile communication device of claim 2, wherein the transmission of the another location update request message is performed in response to the location update request message being retransmitted for the predetermined number of times.

4. The mobile communication device of claim 1, wherein the controller module is further arranged for detecting, via the wireless module, that the mobile communication device has moved out of the first location area, and, in response to the movement, transmitting, via the wireless module, the another location update request message to a third cellular station belonging to a third location area where the mobile communication device is currently in.

5. The mobile communication device of claim 1, wherein the controller module is further arranged for receiving another location update rejection message comprising the same rejection cause from the second cellular station via the wireless module, and performing a Public Land Mobile Network (PLMN) search procedure via the wireless module in response to the another location update rejection message.

6. The mobile communication device of claim 5, wherein the controller module is further arranged for determining at least one second service network and at least one fourth cellular station of the second service network according to a result of the PLMN search procedure, and transmitting the another location update request message to the fourth cellular station via the wireless module.

7. A location registration method, applied in a mobile communication device wirelessly connected to a first service network comprising a first cellular station and a second cellular station which belong to a first location area and a second location area, respectively, the location registration method comprising:
- transmitting a location update request message to the first cellular station of the first service network;
- receiving a location update rejection message from the first cellular station, wherein the location update rejection message comprises a rejection cause indicating a network related failure; and
- transmitting another location update request message to the second cellular station of the first service network in response to the mobile communication device being in an overlapped area of the first location area and the second location area and receiving the location update rejection message.

8. The location registration method of claim 7, further comprising: retransmitting the location update request message to the first cellular station, in response to the location update rejection message, wherein the step of retransmitting the location update request message is performed for a predetermined number of times until a location update acceptance message is received from the first cellular station.

9. The location registration method of claim 8, wherein the step of transmitting the another location update request message is performed in response to the location update request message being retransmitted for the predetermined number of times.

10. The location registration method of claim 7, further comprising: detecting that the mobile communication device has moved out of the first location area, and, in response to the movement, transmitting the another location update request message to a third cellular station belonging to a third location area where the mobile communication device is currently in.

11. The location registration method of claim 7, further comprising: receiving another location update rejection message comprising the same rejection cause from the second cellular station, and performing a Public Land Mobile Network (PLMN) search procedure in response to the another location update rejection message.

12. The location registration method of claim 11, further comprising: determining at least one second service network and at least one fourth cellular station of the second service network according to a result of the PLMN search procedure, and transmitting the another location update request message to the fourth cellular station.

\* \* \* \* \*